(12) United States Patent
Siwko et al.

(10) Patent No.: US 10,584,773 B2
(45) Date of Patent: Mar. 10, 2020

(54) AUTOMATIC TORQUE TRANSMISSION

(71) Applicants: John Siwko, Marlboro, MA (US);
Robert P. Siwko, Brooklyn, CT (US);
Andrew J. Siwko, Richmond, VA (US)

(72) Inventors: John Siwko, Marlboro, MA (US);
Robert P. Siwko, Brooklyn, CT (US);
Andrew J. Siwko, Richmond, VA (US)

( * ) Notice: Subject to any disclaimer, the term of this patent is extended or adjusted under 35 U.S.C. 154(b) by 0 days.

(21) Appl. No.: 16/107,569

(22) Filed: Aug. 21, 2018

(65) Prior Publication Data
US 2019/0376582 A1    Dec. 12, 2019

Related U.S. Application Data

(60) Provisional application No. 62/681,326, filed on Jun. 6, 2018.

(51) Int. Cl.
*F16H 3/66* (2006.01)
*F16H 63/46* (2006.01)
*F16H 37/08* (2006.01)
*F16D 48/06* (2006.01)

(52) U.S. Cl.
CPC ............... *F16H 3/66* (2013.01); *F16H 63/46* (2013.01); *F16D 48/066* (2013.01); *F16D 2500/30806* (2013.01)

(58) Field of Classification Search
CPC . F16H 3/66; F16H 63/46; F16H 37/08; F16D 48/066
See application file for complete search history.

(56) References Cited

U.S. PATENT DOCUMENTS

| | | | | |
|---|---|---|---|---|
| 3,009,368 A | * | 11/1961 | De Lorean | F16H 47/085 475/38 |
| 3,400,777 A | * | 9/1968 | Hill | B60K 17/3465 180/249 |
| 3,929,200 A | * | 12/1975 | Behar | B60K 17/3465 180/250 |
| 4,417,484 A | * | 11/1983 | Gaus | F16H 3/663 475/276 |
| 4,592,250 A | * | 6/1986 | Plasencia | F16H 3/663 192/105 BA |
| 4,706,517 A | * | 11/1987 | Garrett | B60K 17/346 180/247 |
| 4,756,210 A | * | 7/1988 | Franklin | F16H 45/02 192/3.28 |
| 4,817,753 A | * | 4/1989 | Hiketa | B60K 17/3462 180/249 |
| 5,007,887 A | | 4/1991 | Asada | |

(Continued)

*Primary Examiner* — Tinh Dang
(74) *Attorney, Agent, or Firm* — Brian M. Dingman; Dingman IP Law, PC

(57) ABSTRACT

An automatic torque transmission with one or more stages, where each stage has a number of available gear ratios. A planetary gear train includes a planet gear, a sun gear, and a ring gear. The planet gear is configured to drive the sun gear at higher speed and lower torque, and the ring gear at lower speed and higher torque. The sun gear is coupled to an input of a differential gear train. The ring gear is coupled to a different input of the differential gear train. A brake clutch can be selectively coupled to the ring gear, to provide selective braking of the ring gear so as to selectively transfer drive from the ring gear to the sun gear.

15 Claims, 9 Drawing Sheets

(56) References Cited

U.S. PATENT DOCUMENTS

| | | | | |
|---|---|---|---|---|
| 5,743,824 | A * | 4/1998 | Park | F16H 3/66 |
| | | | | 475/276 |
| 8,630,775 | B2 * | 1/2014 | Kitaori | F16H 61/0213 |
| | | | | 477/107 |
| 9,188,176 | B2 | 11/2015 | Jerwick et al. | |
| 9,637,127 | B1 * | 5/2017 | Cooper | B60W 30/18 |
| 2019/0283566 | A1 * | 9/2019 | Nilsson | B60K 6/48 |

* cited by examiner

AUTOMATIC TORQUE TRANSMISSION

CROSS-REFERENCE TO RELATED APPLICATION

This application claims priority of application 62/681,326, with a filing date of Jun. 6, 2018, the entire disclosure of which is incorporated herein by reference.

BACKGROUND

This disclosure relates to an automatic transmission. Most automatic transmissions use a torque converter between the engine and the gear train. Torque converters reduce the efficiency of the transmission.

SUMMARY

This disclosure features a simple automatic transmission design not requiring a torque converter and which is scalable in size. Transmission stages may be added to double the number of gear ratios with each stage.

A stage of the transmission typically includes a planetary gear train that is used to split the input into two outputs with different speed and torque. Also included is a differential gear train that is used to blend the two outputs of the planetary gear train into a single output. The differential gear train can also be used to provide forward or reverse drive. A brake for the planetary ring gear is used to control the speed of the ring gear and gradually transfer drive to the sun gear. This determines the speed of the ring and sun gears, which are blended into a single output by the differential gear train. A result is that the output speed can be controlled from zero to the speed of the sun gear. A one-way clutch for the sun gear is used to pass higher torque from the ring gear to the output, and engage high torque. A speed/torque sensor can be used to control the braking of the ring gear. Note that the change of the transmission output speed is step-less, but the torque of each stage is either high (ring gear) or low (sun gear). Therefore a number of interconnected sequential stages can be used to make the torque steps small enough for the input drive to handle.

The transmission can have multiple arrangements of planetary and differential gear trains. Gear pump brake clutches can be used for control. Also, the transmission has a neutral state (i.e., it can be set to free-wheel) that eliminates the need for a clutch or a torque converter to connect to the prime mover (which can be an internal combustion engine as one non-limiting example). In one example, the transmission uses gear pumps that are configured to assist change of gear ratios.

The transmission is able to accomplish the following: A neutral state that eliminates the need for a torque converter or clutch to connect it to the drive. Low speed with high torque. High speed with low torque. Automatic step-less speed change. The full range of speeds in both forward and reverse. Multiple torque ratios. The transmission can be scaled to fit different applications, such as automotive or heavy machinery.

The transmission includes a single stage, or multiple stages. Multiple stages can expand the range and quantity of gear ratios. Each stage includes a planetary gear train connected to a differential gear train. The last stage includes another (output) differential gear train that is configured to provide reverse drive.

The planetary gear train can have a single or double planet gear. The planetary gear train can be used to split the input into two outputs. One output can be via the ring gear and have a lower speed and higher torque. The second output can be via the sun gear and have a higher speed and lower torque. Typically, the ring gear, having higher torque, will dominate the drive. By applying a brake to the ring gear, the drive is transferred to the sun gear, with higher speed.

The two outputs from the planetary gear train can be combined into single output with a differential gear train that has an output equal to the sum of two inputs divided by two. With the planetary gear train and differential gear train joined together, the output speed will range from 0.666 to 2 times the input. The torque will be the inverse of speed (1/speed ratio).

Each stage of a multiple-stage transmission can have two gear ratios. Each additional stage will multiply the number of available ratios by two. Thus the number of available gear ratios increases exponentially with the number of stages.

To control the output speed, the sun gear and ring gear need to be separately controlled. The sun gear can be controlled using a one-way clutch to stop it going in reverse; the clutch can be a simple one-way clutch, or a one-way clutch with means to disengage the clutch. The ring gear can be controlled using a brake clutch. The brake clutch can be, for example, a gear pump brake clutch, a disk clutch, or a band clutch.

For automatic speed control, a speed sensor is included, attached to the output shaft. The speed sensor output can be applied to the brake clutches of the different stages. The brake clutches of the different stages can have different springs so that they close at different rates relative to the speed sensor output pressure.

All examples and features mentioned below can be combined in any technically possible way.

In one aspect, an automatic torque transmission with one or more stages, where each stage has a number of available gear ratios, includes a planetary gear train comprising a planet gear on a planet gear carrier, a sun gear, and a ring gear, wherein an input to the planetary gear train is through the planet gear carrier, and wherein the planet gear is configured to drive the sun gear at higher speed and lower torque, and the ring gear at lower speed and higher torque. There is a first differential gear train having a first input side, a second input side, and an output, wherein the sun gear is coupled to the first input side of the first differential gear train and the ring gear is coupled to the second input side of the first differential gear train, thereby combining two inputs into a single output. A brake clutch is configured to be selectively coupled to the ring gear, to provide selective braking of the ring gear so as to selectively transfer drive from the ring gear to the sun gear. A one-way clutch is configured to be selectively engaged or disengaged from the sun gear, to selectively prevent rotation of the sun gear in one direction. The output of the differential gear train is coupled to either another stage of the transmission or to an output differential gear train. The output differential gear train is configured to be locked for forward drive or coupled to a housing for reverse drive. With the one-way clutch disengaged the sun gear will freewheel by rotating in reverse, with no output.

Embodiments may include one of the above and/or below features, or any combination thereof. The transmission may comprise a plurality of sequentially connected stages, each stage defining a plurality of available gear ratios. Each sequentially connected stage may double the number of available gear ratios of a previous stage. An output from the transmission may comprise at least one of: a gear pump that is configured to provide a variable pressure output; and a sensor that is configured to provide a signal that can be used for automatic control of gear changes. The brake clutch and the one-way clutch may both be configured to be set to neutral, and when the brake clutch and one-way clutches are both set to neutral the ring gear and the sun gear may both freewheel and cause the transmission to provide no output drive.

Embodiments may include one of the above and/or below features, or any combination thereof. With the one-way clutch engaged to the sun gear and the brake not applied to the ring gear, the ring gear will dominate the drive at higher torque and low speed. With the one-way clutch engaged to the sun gear and the and the brake applied to the ring gear, the ring gear will slow down and allow the sun gear to dominate the drive, to accomplish a stepless gear change. An equal number of forward and reverse gears may be produced by the transmission. The transmission may be scaled in size to scale the power handling. Multiple stages may be coupled, to increase the number of available gear ratios.

Embodiments may include one of the above and/or below features, or any combination thereof. The transmission may further comprise a speed sensor coupled to a transmission output. The speed sensor may be configured to provide an output pressure that is proportional to a transmission output speed. The speed sensor output pressure may be used for control of the brake clutch on the ring gear, to accomplish automatic gear changes. The speed sensor may be configured to generate control pressure. The speed sensor may comprise a gear pump. The brake clutch may comprise a gear pump.

DETAILED DESCRIPTION

Figure 1:
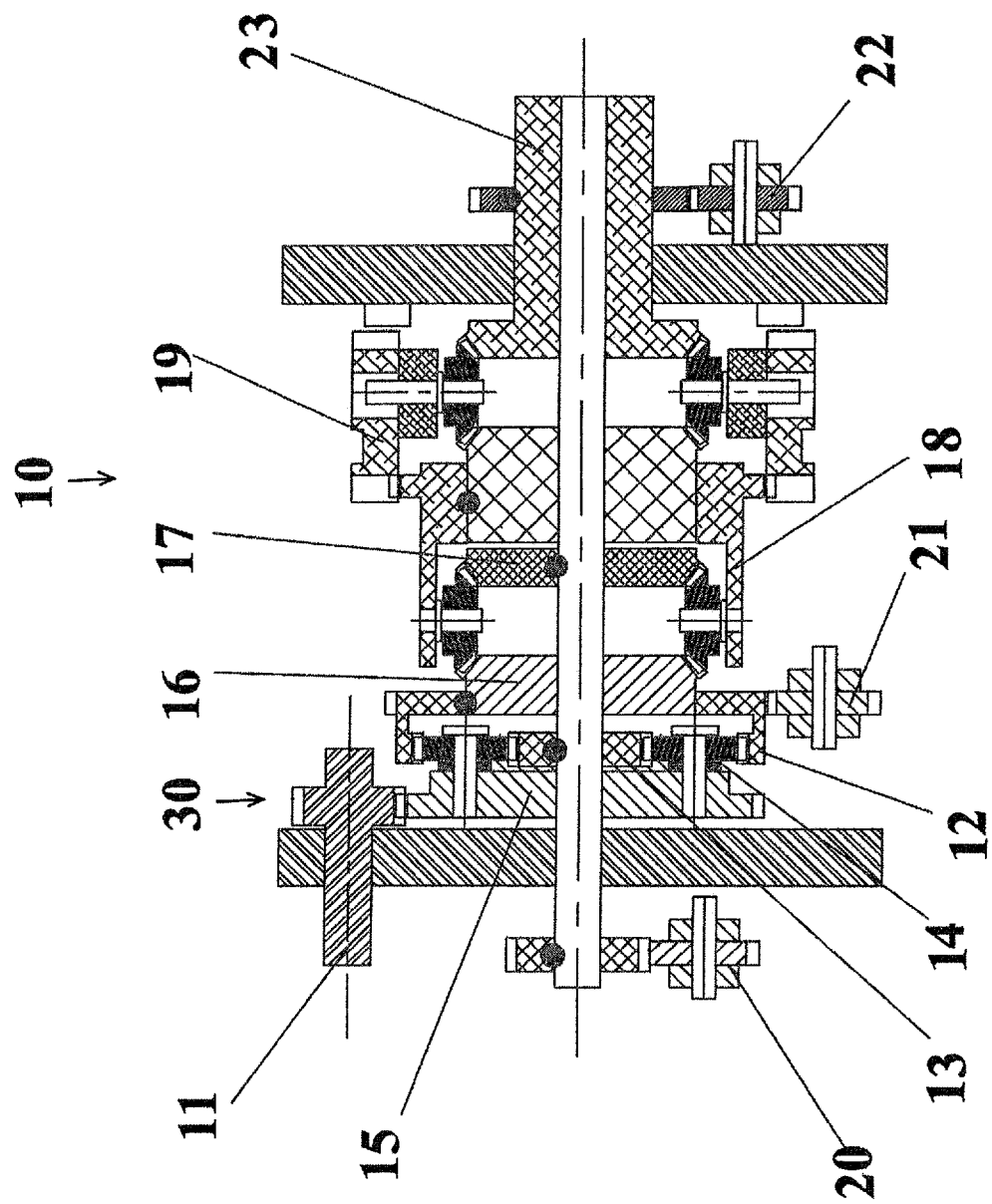
FIG. 1 is a schematic cross-sectional illustration of a single stage automatic torque transmission.

FIG. 1 illustrates a single stage automatic torque transmission 10. Transmission 10 utilizes a planetary gear train 30 at the input side of the single stage. The black dots in the drawings indicate a point of connection of elements of the transmission. Transmission input 11 drives planet gear carrier 15, which drives planet gear 14. Planet gear 14 is engaged with sun gear 13 and ring gear 12 and so distributes the drive to the ring gear and sun gear. Ring gear 12 is coupled to differential bevel gear 16 of the differential gear train. Sun gear 13 is coupled to differential bevel gear 17 of the differential gear train. The ring gear, having higher torque, will drive bevel gear 16. With any resistance from the differential gear train output 18, bevel gear 16 will drive bevel gear 17, which is connected to the sun gear 13, in reverse direction. In this condition the transmission will be free-wheeling in neutral. To engage the transmission, one-way clutch 20 stops the reverse motion of the sun gear 13, and drives output 18 of the differential gear train. This arrangement provides low speed higher torque to the output. To change to the higher speed, brake clutch 21 will slow the ring gear 12 and thus share the drive with the sun gear 13, which is higher speed at lower torque. When ring gear 12 stops, sun gear 13 will take over the drive, at higher speed. As explained in more detail elsewhere herein, speed sensor 22, which is coupled to transmission output 23, can provide a signal that is used to control clutches 20 and 21. Also as further explained below, lock sleeve 19 can be used to switch between forward and reverse.

Figure 2A:
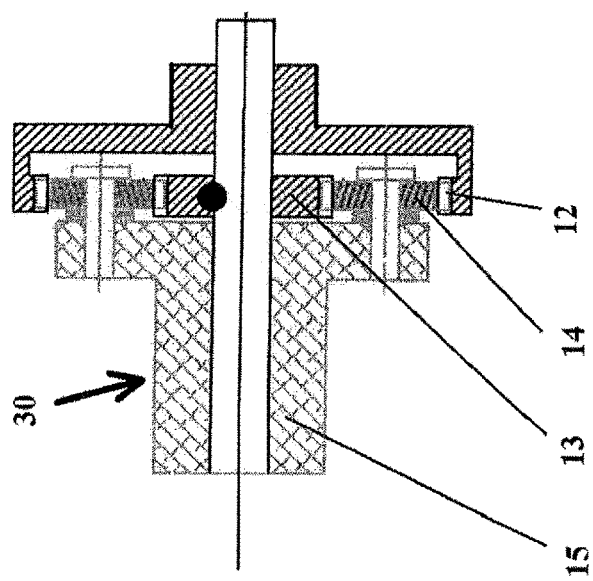
FIGS. 2A-2C illustrate a planetary gear train and two options for use thereof.
Figure 2B:
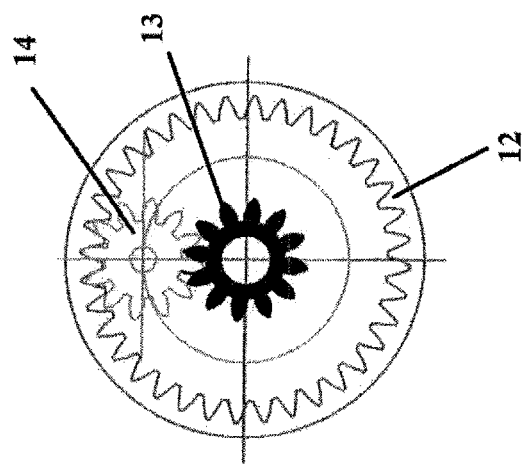
Figure 2C:
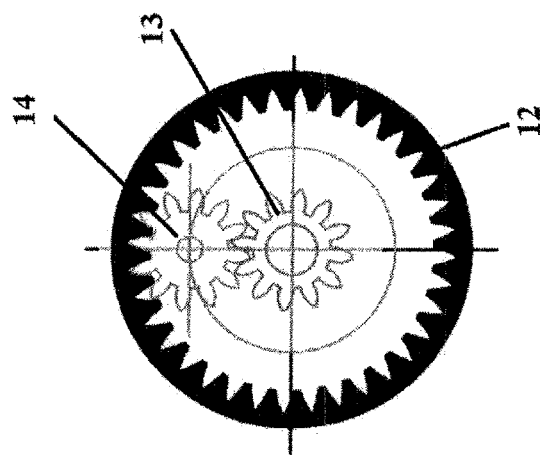

The range of input revolutions and output revolutions of the planetary gear train of FIG. 1 is described in more detail in FIGS. 2A-2C. This is only one specific, non-limiting example of the particular gears used in a planetary gear train. Other gears/gear ratios can be used, to accomplish different results as would be apparent to one skilled in the technical field. Planetary gear train 30 comprises planet carrier (input) 15, planet gear 14 (with 12 teeth), sun gear 13 (with 12 teeth), and ring gear 12 (with 36 teeth). FIG. 2B illustrates one situation, where sun gear 13 is locked (as indicated by the dark black coloring), while planet gear 14 and ring gear 12 are free to rotate. For one rotation of planet carrier 15, the ring gear rotates 1.33 times. FIG. 2C illustrates a second situation, where ring gear 12 is locked, while planet gear 14 and sun gear 13 are free to rotate. For one rotation of planet carrier 15, the sun gear rotates 4 times.

Figure 3:
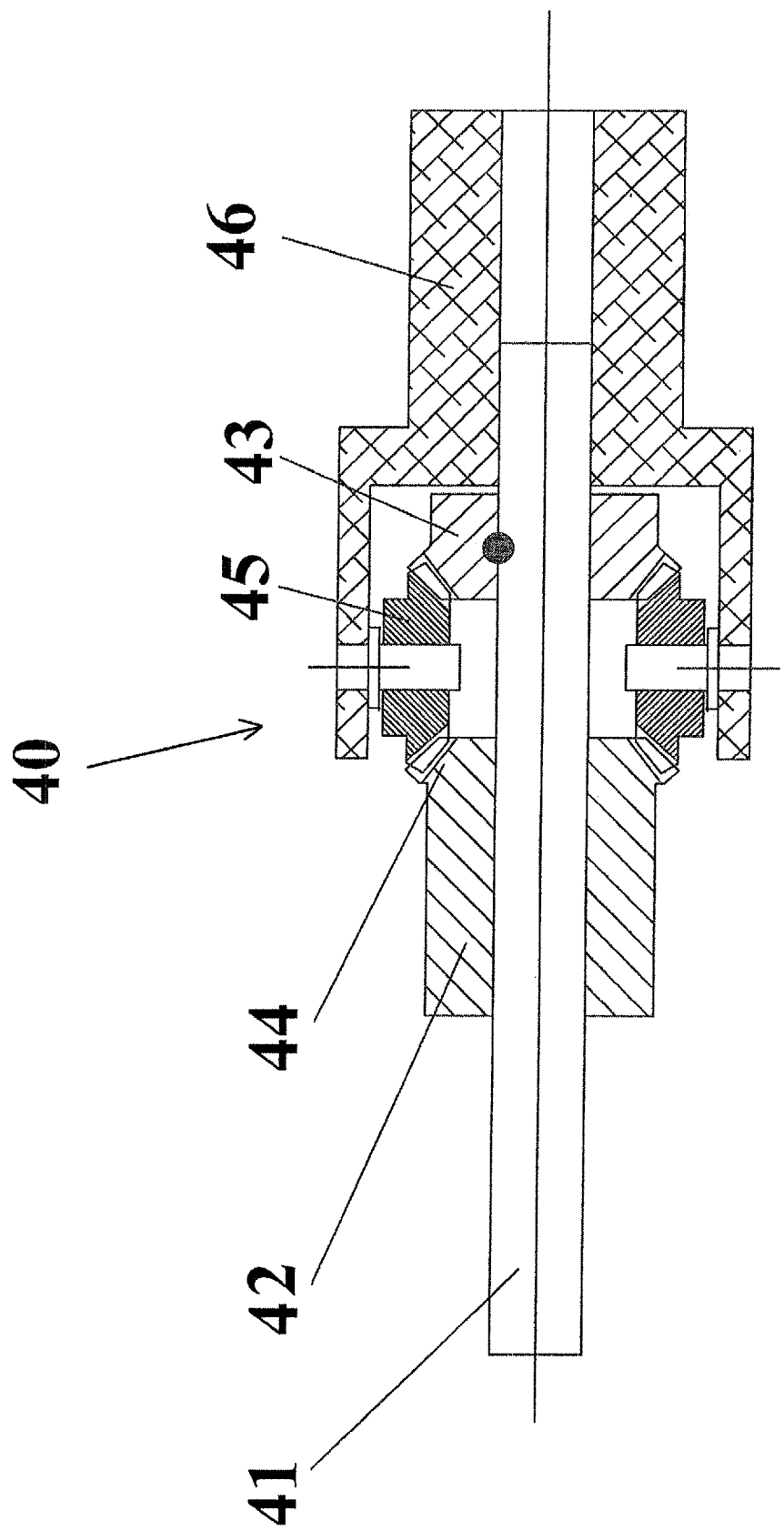
FIG. 3 is a schematic cross-sectional illustration of a differential gear train.

FIG. 3 illustrates differential gear train 40 with input 41 from a sun gear, input 42 from a ring gear, bevel gear 43 that is coupled to input 41, bevel gear 44 that is coupled to input 42, and bevel gear 45 that is coupled to output 46. Gears 43 and 44 are the same size. The following Table 1 describes the ranges of inputs and resulting outputs.

TABLE 1

| Input | Resulting Output |
| --- | --- |
| Input through 41. Output 46 locked. | Output through 42, equal to: input 41 in reverse. |
| Input through 42. Output 46 locked. | Output through 41, equal to: input 42 in reverse. |
| Input through 41 and 42 | Output through 46, equal to: (input 41 + input 42) ÷ 2 |
| Input through 41. Input 42 locked. | Output through 46 equal to: input 41 ÷ 2 |
| Input through 42. Input 41 locked. | Output through 46 equal to: input 42 ÷ 2 |

Figure 4:
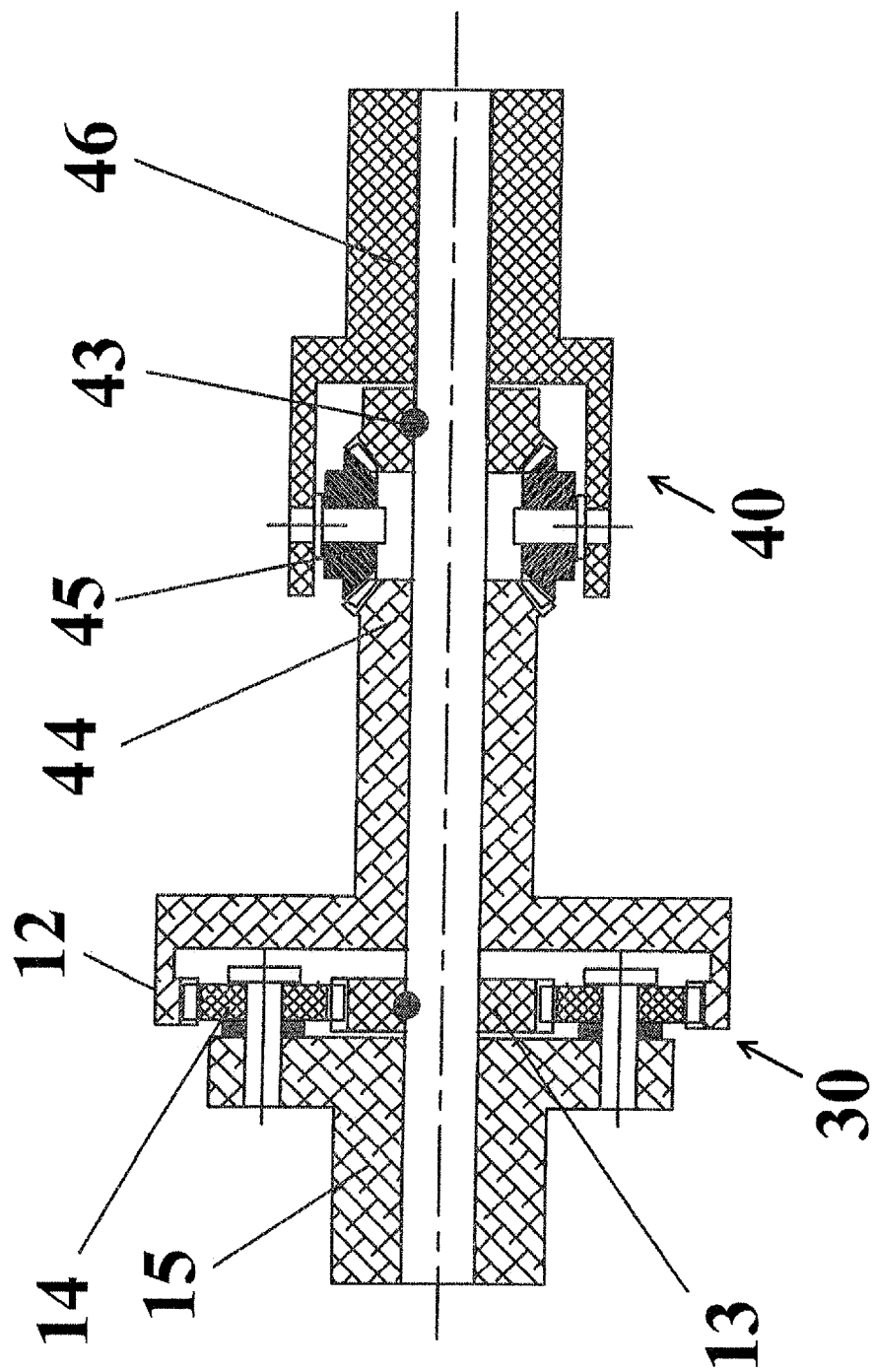
FIG. 4 is a schematic cross-sectional illustration of a planetary gear train coupled to a differential gear train.

FIG. 4 illustrates a combination of planetary gear train 30 (FIG. 2A) and differential gear train 40 (FIG. 3). Input is via planet gear carrier 15. The following Table 2 describes the types of rotations of the planetary and differential gear trains and the resulting outputs. The formula to calculate the output is: (input 1+input 2)÷2.

TABLE 2

| Input rotations | Output rotation (from output 46) |
| --- | --- |
| Ring gear 1 + sun gear −1 | 0 |
| Ring gear 1 + sun gear 0 | ½ |
| Ring gear 1 + sun gear 1 | 1 |
| Ring gear 0 + sun gear 4 | 2 |

Figure 5:
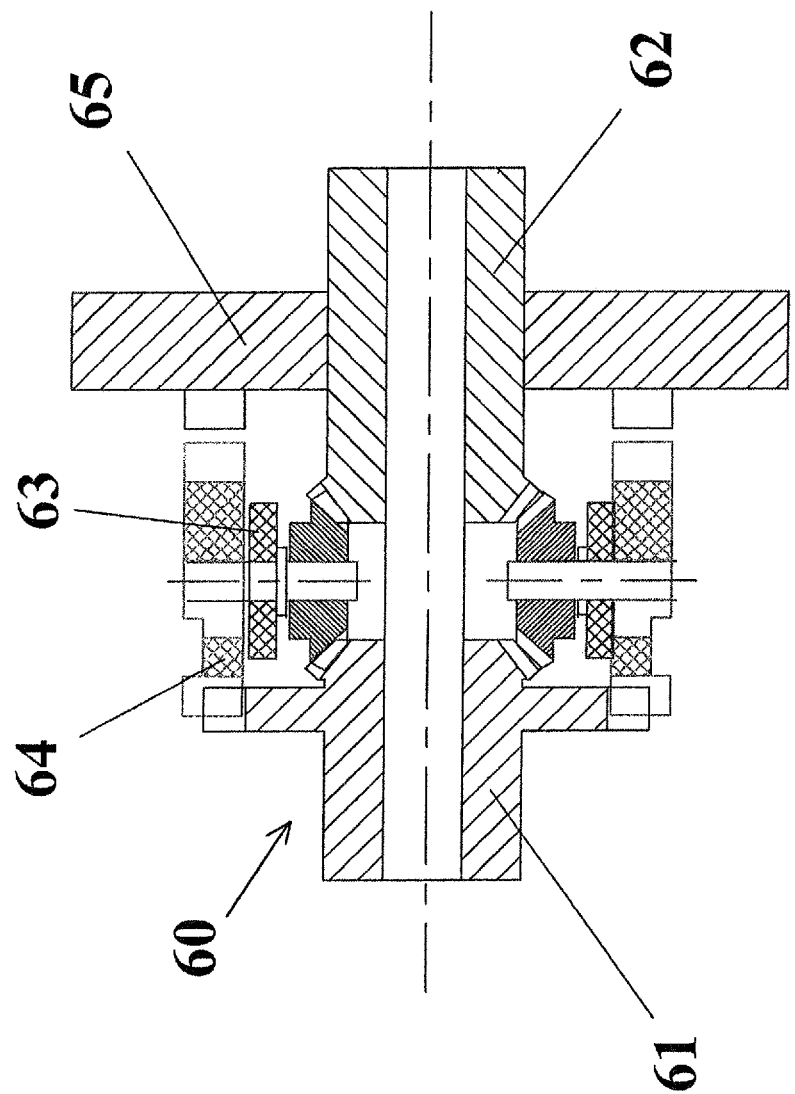
FIG. 5 is a schematic cross-sectional illustration of a differential gear train that accomplishes forward and reverse drive.

FIG. 5 illustrates a manner in which the differential gear train can be used to operate the transmission in forward and reverse drive. Differential gear train with forward and reverse drive 60 includes input 61, output 62, bevel gear ring 63, bevel gear lock sleeve 64, and housing 65. Lock sleeve 64 is coupled to bevel gear ring 63. Lock sleeve 64 is movable to two positions. In one position it locks bevel gear ring 63 to input 61. In the other position it locks bevel gear ring 63 to housing 65. To operate in forward, lock sleeve 64 is operated such that bevel gear ring 63 is locked to input 61. To operate in reverse, lock sleeve 64 is operated such that bevel gear ring 63 is locked to housing 65. Other manners of selectively locking the differential to the housing so as to accomplish reverse drive are contemplated herein. A result is that all of the speeds are available in both forward and reverse.

Figure 6:
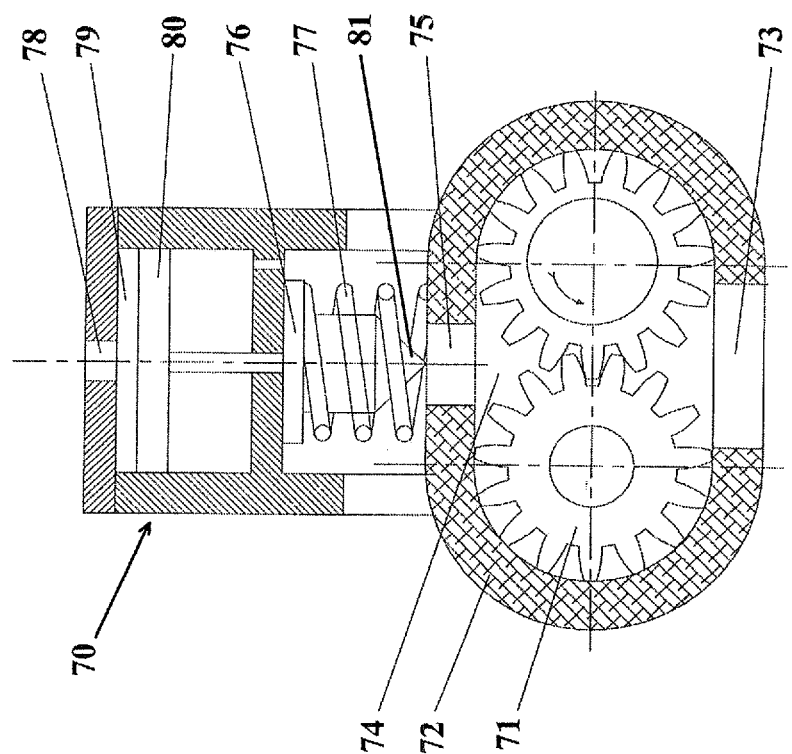
FIG. 6 is a schematic cross-sectional illustration of a gear pump brake clutch for the transmission.

FIG. 6 illustrates a non-limiting example of a gear pump 70 that can be used as a brake clutch for the transmission. A pair of gears 71 closely meshing inside a close-fitting housing 72 carry fluid from fluid inlet (input) 73 to close fitting chamber 74 and then fluid outlet 75. Plunger 76, supported by spring 77, controls the orifice size of outlet 75 via motion of conical closure element 81. Pressure applied through pressure inlet 78 to cylinder 79 pushes piston 80 and plunger 76, compresses spring 77, and reduces or closes orifice 75. When orifice 75 is fully open there is no pressure buildup in chamber 74 and gears 71 rotate freely. As the orifice 75 closes, the fluid pressure in chamber 74 builds up and slows down rotation of gears 71 and acts as a brake. When orifice 75 is fully closed pressure in chamber 74 builds up sufficiently to stop gears 71 from rotating and act as a clutch.

Figure 7:
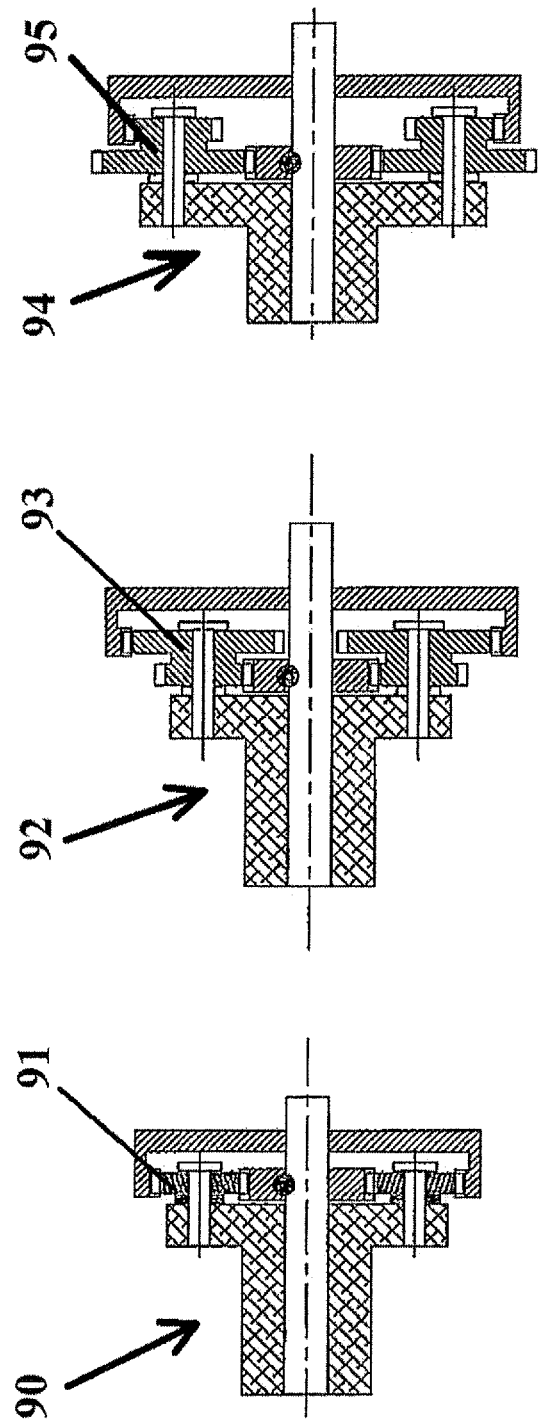
FIGS. 7A-7C are three schematic cross-sectional illustrations of different configurations of planetary gear trains.

FIGS. 7A-7C illustrate three variations of a planet gear for a planetary gear train. Planetary gear train 90, FIG. 7A, includes single pinion planet gear 91. Planetary gear train 92, FIG. 7B, includes double pinion planet gear 93. Planetary gear train 94, FIG. 7C, includes a different double pinion planet gear 95. Double pinion planet gears can be used to drive the sun and ring gears at different rates, depending on the pitch of the two toothed gear portions that are coupled to the sun and ring gears, as depicted in FIGS. 7B and 7C.

Figure 8:
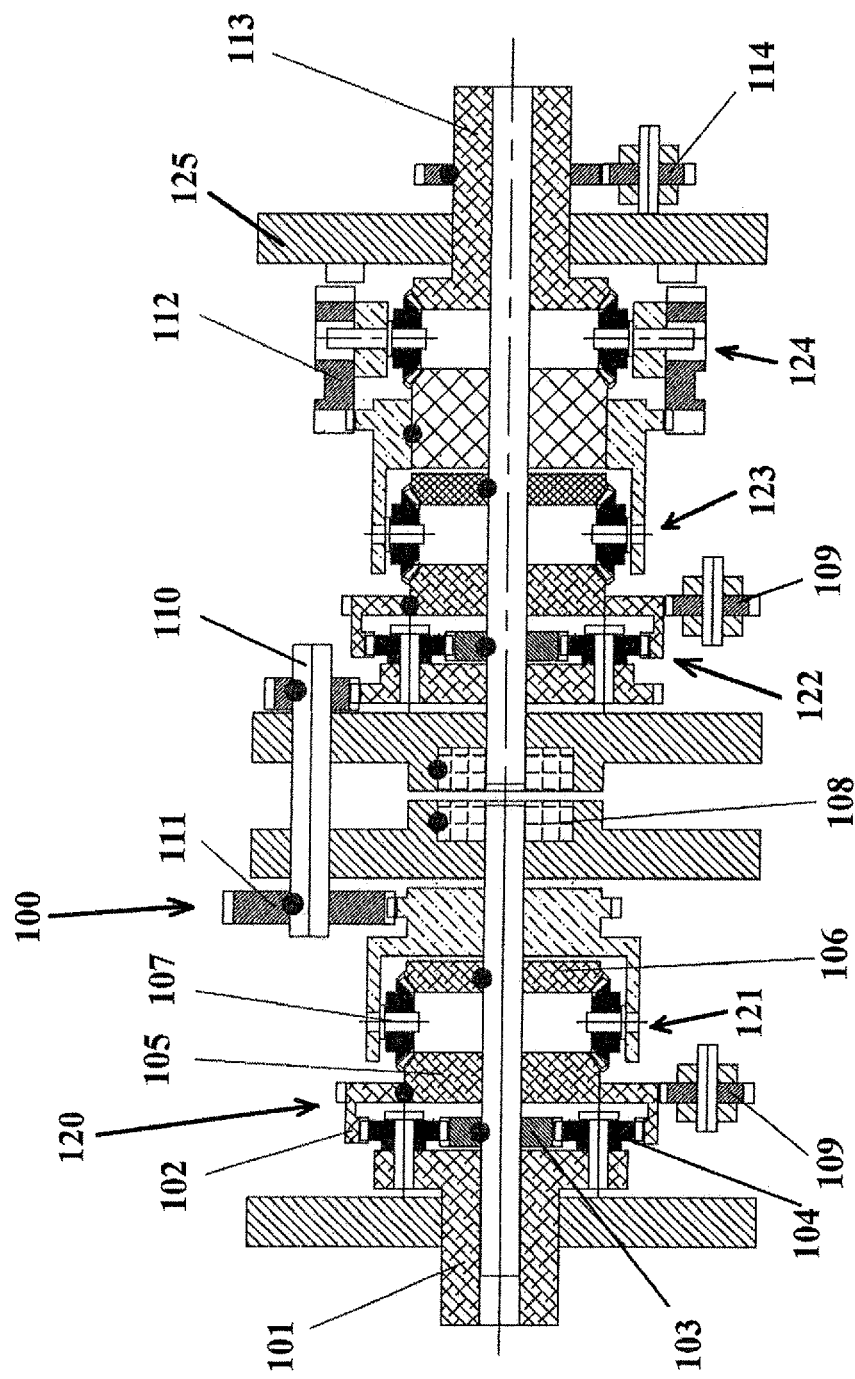
FIG. 8 is a schematic cross-sectional illustration of a two stage automatic torque transmission.

The transmission 100 shown in FIG. 8 is a two-stage transmission, with four forward ratios, neutral, and reverse drive. Simple gear pumps, configured as clutches, provide for smooth transfer between gear ratios.

In transmission 100 the drive comes into a first planetary gear train 120 through the planet gear carrier 101. The planet gear 104 distributes drive to ring gear 102 and sun gear 103. Ring gear 102 drives differential bevel gear 105, and sun gear 103 drives opposed differential bevel gear 106 of first differential gear train 121. Ring gear 102 having higher torque will drive bevel gear 105. With any resistance from differential gear train output 110, bevel gear 107 will drive bevel gear 106, which is connected to the sun gear 103, in reverse direction. In this condition the transmission will be free-wheeling in neutral. To engage transmission 100 one-way clutch 108 stops the reverse motion of sun gear 103 and drives output 110 of first differential gear train 121. This arrangement provides low speed higher torque to the output. To change to the higher speed brake clutch 109 will slow ring gear 102 and thus share the drive with sun gear 103, which is higher speed at lower torque. When ring gear 102 stops, sun gear 103 will take over the drive, at higher speed.

Drive from the first stage is transferred to the second stage with speed reduction gears 111. The second stage works the same way as the first stage, with second planetary gear train 122 and second differential 123, except that it has added another (third) differential gear train 124, to add reverse drive, and a gear pump 114 configured to generate pressure controlled by the speed for automatic control of the gear change. Sleeve 112 locks the center bevel gear to the transmission output drive for forward drive, or locks it to the housing 125 for reverse drive of output 113. Control gear pump 114 is coupled to the output 113.

To simplify the automatic gear change only two ratios per stage are used. However, there could be more than two gear ratios per stage. On startup, brake clutches 109 are opened and one way clutches 108 are closed, so drive starts at low speed and high torque. The clutch 109 for each stage is set for a different pressure, to match set speeds. As the speed increases, pump 114 increases pressure and sequentially closes brakes 109 at preset speeds. This way the gear change is stepless, automatic, and linked to speed. To use all available ratios a more elaborate gear matching and control system can be used.

Figure 9:
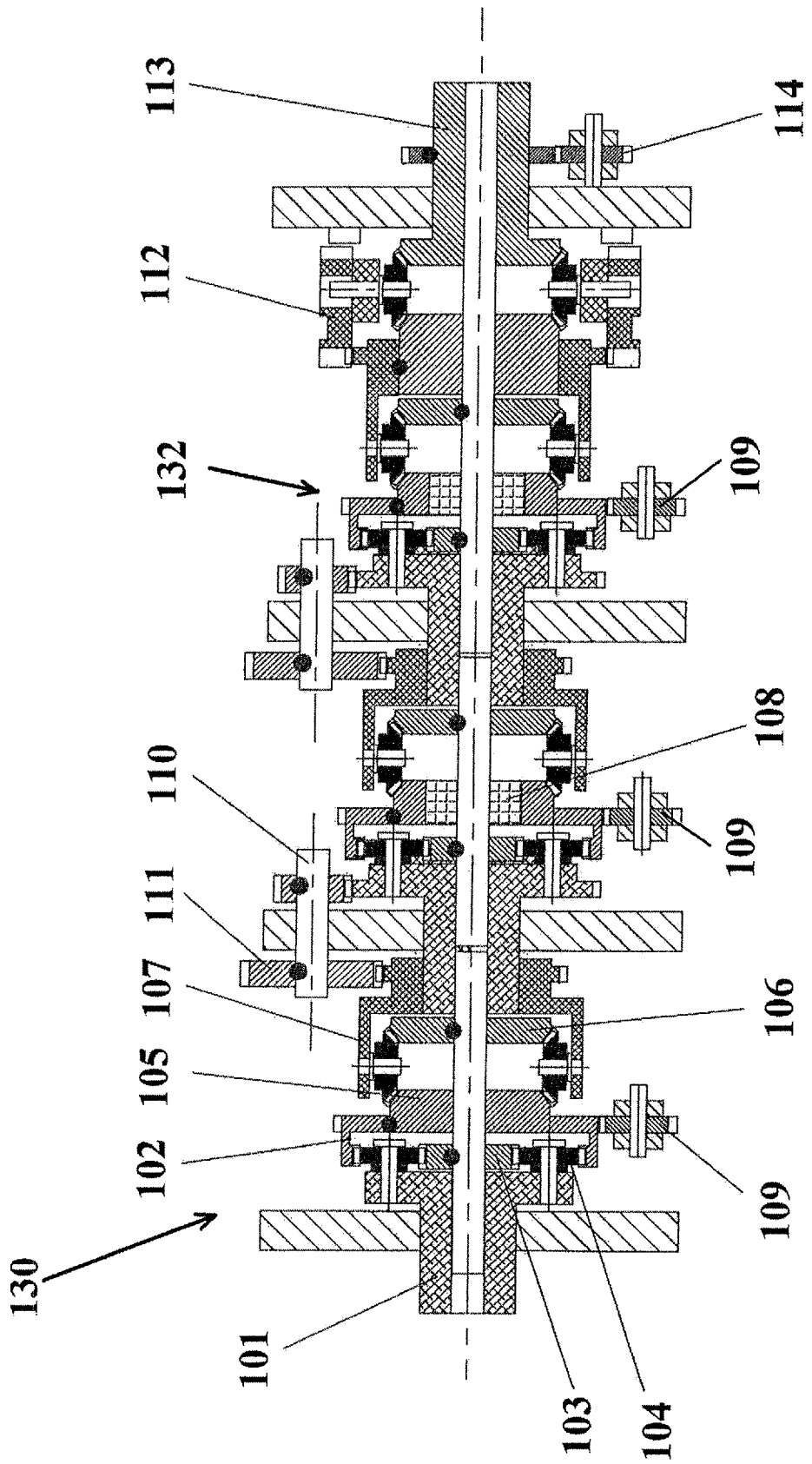
FIG. 9 is a schematic cross-sectional illustration of a three stage automatic torque transmission.

The transmission 130 shown in FIG. 9 is a three-stage transmission being the same as in FIG. 8 except that one more stage 132 is added and in one stage the sun gear does not have a one-way clutch and in the other stages a one-way clutch couples the sun gear to the ring gear. This puts the transmission into a neutral state. To start rolling, brake clutch 109, on the stage without the one-way clutch, is set to reduce torque of the ring gear to equal torque of the sun gear, to prevent the sun gear rotating in reverse. Coupling of the sun gear to the ring gear with a one-way clutch, will prevent the differential gear train from dividing high torque by two. This is compensated by the speed reduction gears 111.

The transmission 10 shown in FIG. 1 is a single-stage transmission being the same as in FIG. 8, except that it has only one stage, and input is through a reduction gear to extend output range.

Table 3 includes gear ratios at each stage for an exemplary four-stage transmission, each stage having the same gear set. Table 4 includes gear ratios for a similar four-stage transmission, but with each stage having a different gear ratio as set forth in the table. The different gear ratios can be accomplished with gears having different pitch diameters.

TABLE 3

| stage 1 | stage 2 | stage 3 | stage 4 |
| --- | --- | --- | --- |
| 0.666 | 0.4435 | 0.2954 | 0.1967 |
|  | 1.332 | 0.879 | 0.585 |
| 2 | 1.332 | 0.879 | 0.585 |
|  | 4 | 2.664 | 1.774 |
|  |  | 0.887 | 0.585 |
|  |  | 2.664 | 1.774 |
|  |  | 2.664 | 1.774 |
|  |  | 8 | 5.328 |
|  |  |  | 0.588 |
|  |  |  | 1.758 |
|  |  |  | 1.758 |
|  |  |  | 5.328 |
|  |  |  | 1.774 |
|  |  |  | 5.328 |
|  |  |  | 5.328 |
|  |  |  | 16 |

TABLE 4

| | | | | |
| --- | --- | --- | --- | --- |
| Low gear ratio | 0.60 | 0.70 | 0.80 | 0.33 |
| High gear ratio | 2.00 | 1.70 | 1.30 | 1.00 |

TABLE 4-continued

| stage 1 | stage 2 | stage 3 | stage 4 |
|---------|---------|---------|---------|
| 0.60    | 0.42    | 0.34    | 0.11    |
| 2.00    | 1.40    | 1.12    | 0.37    |
|         | 1.02    | 0.82    | 0.27    |
|         | 3.40    | 2.72    | 0.90    |
|         |         | 0.55    | 0.18    |
|         |         | 1.82    | 0.60    |
|         |         | 1.33    | 0.44    |
|         |         | 4.42    | 1.46    |
|         |         |         | 0.34    |
|         |         |         | 1.12    |
|         |         |         | 0.82    |
|         |         |         | 2.72    |
|         |         |         | 0.55    |
|         |         |         | 1.82    |
|         |         |         | 1.33    |
|         |         |         | 4.42    |

A number of implementations have been described. Nevertheless, it will be understood that additional modifications may be made without departing from the scope of the inventive concepts described herein, and, accordingly, other embodiments are within the scope of the following claims.

What is claimed is:

1. An automatic torque transmission, comprising:
    at least one stage, each stage defining a plurality of available gear ratios and comprising:
        a planetary gear train comprising a planet gear mounted on a planet gear carrier, a sun gear, and a ring gear, wherein an input to the planetary gear train is through the planet gear carrier, and wherein the planet gear is configured to drive the sun gear at higher speed and lower torque and the ring gear at lower speed and higher torque;
        a first differential gear train having a first input side, a second input side, and an output, wherein the sun gear is coupled to the first input side of the first differential gear train and the ring gear is coupled to the second input side of the first differential gear train, thereby combining two inputs into a single output;
        a brake clutch that is configured to be selectively coupled to the ring gear, to provide selective braking of the ring gear so as to selectively transfer drive from the ring gear to the sun gear; and
        a one-way clutch that is configured to be selectively engaged or disengaged from the sun gear, to selectively prevent rotation of the sun gear in one direction; and
    a transmission housing;
    wherein the output of the first differential gear train is coupled to either another stage of the transmission or to an output differential gear train, wherein the output differential gear train is configured to be locked for forward drive or coupled to the housing for reverse drive, and wherein with the one-way clutch disengaged the sun gear will freewheel by rotating in reverse, with no output.

2. The automatic torque transmission of claim 1, comprising a plurality of sequentially connected stages, each stage defining a plurality of available gear ratios.

3. The automatic torque transmission of claim 2, wherein each sequentially connected stage doubles the number of available gear ratios of a previous stage.

4. The automatic torque transmission of claim 1, wherein an output from the transmission comprises at least one of: a gear pump that is configured to provide a variable pressure output; and a sensor that is configured to provide a signal that can be used for automatic control of gear changes.

5. The automatic torque transmission of claim 1, wherein the brake clutch and the one-way clutch are both configured to be set to neutral, and wherein when the brake clutch and one-way clutches are both set to neutral the ring gear and the sun gear will both freewheel and cause the transmission to provide no output drive.

6. The automatic torque transmission of claim 1, wherein with the one-way clutch engaged to the sun gear and the brake not applied to the ring gear, the ring gear will dominate the drive at higher torque and low speed.

7. The automatic torque transmission of claim 1, wherein with the one-way clutch engaged to the sun gear and the and the brake applied to the ring gear, the ring gear will slow down and allow the sun gear to dominate the drive, to accomplish a stepless gear change.

8. The automatic torque transmission of claim 1, wherein an output from the transmission operates at different speeds, and wherein an equal number of forward and reverse speeds are produced by the transmission.

9. The automatic torque transmission of claim 1, further comprising a speed sensor coupled to a transmission output.

10. The automatic torque transmission of claim 9, wherein the speed sensor is configured to provide an output pressure that is proportional to a transmission output speed.

11. The automatic torque transmission of claim 10, wherein the speed sensor output pressure is used for control of the brake clutch on the ring gear, to accomplish automatic gear changes.

12. The automatic torque transmission of claim 9, wherein the speed sensor is configured to generate control pressure.

13. The automatic torque transmission of claim 9, wherein the speed sensor comprises a gear pump.

14. The automatic torque transmission of claim 1, wherein the brake clutch comprises a gear pump.

15. An automatic torque transmission, comprising:
    a plurality of sequentially connected stages, each stage defining a plurality of available gear ratios and comprising:
        a planetary gear train comprising a planet gear mounted on a planet gear carrier, a sun gear, and a ring gear, wherein an input to the planetary gear train is through the planet gear carrier, and wherein the planet gear is configured to drive the sun gear at higher speed and lower torque and the ring gear at lower speed and higher torque;
        a first differential gear train having a first input side, a second input side, and an output, wherein the sun gear is coupled to the first input side of the first differential gear train and the ring gear is coupled to the second input side of the first differential gear train, thereby combining two inputs into a single output;
        a brake clutch that is configured to be selectively coupled to the ring gear, to provide selective braking of the ring gear so as to selectively transfer drive from the ring gear to the sun gear; and
        a one-way clutch that is configured to be selectively engaged or disengaged from the sun gear, to selectively prevent rotation of the sun gear in one direction; and
    a transmission housing;
    wherein the output of the first stage is coupled to another stage of the transmission, and the output of the last stage is coupled to an output differential gear train, wherein the output differential gear train is configured to be locked for forward drive or coupled to the housing for reverse drive, and wherein with the one-way clutch disengaged the sun gear will freewheel by rotating in reverse, with no output;

wherein the brake clutch and the one-way clutch are both configured to be set to neutral, and wherein when the brake clutch and one-way clutches are both set to neutral the ring gear and the sun gear will both freewheel and cause the transmission to provide no output drive;

wherein with the one-way clutch engaged to the sun gear and the brake not applied to the ring gear, the ring gear will dominate the drive at higher torque and low speed and wherein with the one-way clutch engaged to the sun gear and the and the brake applied to the ring gear, the ring gear will slow down and allow the sun gear to dominate the drive, to accomplish a stepless gear change; and wherein an output from the transmission operates at different speeds, and wherein an equal number of forward and reverse speeds are produced by the transmission.

\* \* \* \* \*